United States Patent
Ryan et al.

(10) Patent No.: US 6,530,076 B1
(45) Date of Patent: Mar. 4, 2003

(54) DATA PROCESSING SYSTEM PROCESSOR DYNAMIC SELECTION OF INTERNAL SIGNAL TRACING

(75) Inventors: Charles P. Ryan, Phoenix, AZ (US); Ron Yoder, Mesa, AZ (US); William A. Shelly, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/472,114

(22) Filed: Dec. 23, 1999

(51) Int. Cl.[7] .............................. G06F 9/44; G06F 9/45; G06F 11/28
(52) U.S. Cl. ...................... 717/128; 717/124; 712/227; 714/38; 714/45
(58) Field of Search ................................ 712/219, 227, 712/243, 244, 245, 300; 717/128, 142, 124; 714/45, 38, 30

(56) References Cited

U.S. PATENT DOCUMENTS

| | | | | |
|---|---|---|---|---|
| 5,197,133 A | * | 3/1993 | Shen et al. | 712/219 |
| 6,009,270 A | * | 12/1999 | Mann | 717/128 |

* cited by examiner

*Primary Examiner*—Daniel H. Pan
(74) *Attorney, Agent, or Firm*—Bruce E. Hayden; James H. Phillips; John S. Solakian

(57) ABSTRACT

A processor (92) contains a Trace RAM (210) for tracing internal processor signals and operands. A first trace mode separately traces microcode instruction execution and cache controller execution. Selectable groups of signals are traced from both the cache controller (256) and the arithmetic (AX) processor (260). A second trace mode selectively traces full operand words that result from microcode instruction (242). Each microcode instruction word (242) has a trace enable bit (244) that when enabled causes the results of that microcode instruction (242) to be recorded in the Trace RAM (210).

19 Claims, 7 Drawing Sheets

DATA PROCESSING SYSTEM PROCESSOR DYNAMIC SELECTION OF INTERNAL SIGNAL TRACING

CROSS REFERENCE TO RELATED APPLICATION

This application is related to our patent application entitled "APPARATUS FOR SYNCHRONIZING MULTIPLE PROCESSORS IN A DATA PROCESSING SYSTEM", filed Sep. 17, 1998, now U.S. Pat. No. 6,223,228, with Ser. No. 09/156,377, and assigned to the assignee hereof.

This application is related to our patent application entitled "METHOD AND APPARATUS FOR EXHAUSTIVELY TESTING INTERACTIONS AMONG MULTIPLE PROCESSORS", filed Sep. 17, 1998, now U.S. Pat. No. 6,249,880, with Ser. No. 09/156,378, and assigned to the assignee hereof.

This application is related to our patent application entitled "CALENDAR CLOCK CACHING IN A MULTIPROCESSOR DATA PROCESSING SYSTEM", filed Sep. 17, 1998, now U.S. Pat. No. 6,052,700, with Ser. No. 09/156,104, and assigned to the assignee hereof.

This application is related to our patent application entitled "DATA PROCESSING SYSTEM PROCESSOR DELAY INSTRUCTION", filed Sep. 17, 1998, now U.S. Pat. No. 6,230,263 with Ser. No. 09/156,376, and assigned to the assignee hereof.

FIELD OF THE INVENTION

The present invention generally relates to multiprocessing computer systems, and more specifically to dynamically modifying the tracing of internal processor signals during execution.

BACKGROUND OF THE INVENTION

It has become increasingly difficult to determine what exactly a processor in a data processing system is doing at a low level. In particular, it has become extremely difficult to determine the intermediate states and operands in a processor during execution. There are a number of reasons for this problem. One reason is that processor speeds have increased to such an extent that equipment to monitor processor signals has failed to keep up with the increased processor speeds. Indeed, a doubling of processor speed results in much more than a doubling of test equipment costs to record internal processor states during processor execution.

One prior art solution to determining machine states, state transitions, and intermediate operands was to attach monitor probes to the various components and to record the signals generated by these components. This has become increasingly impossible to do as the level of integration has increased. While it was possible to attach probes to component outputs when the components comprised circuit boards, it is not possible when entire processors are incorporated on a single integrated circuit, along with their cache memories. It is even worse, when multiple processors are integrated on a single IC.

One prior art solution to determining machine states and state transitions is through the use of SCAN. Using SCAN, a known pattern of states can be loaded into a processor. The processor then executes one or two instructions. The states of the various memory elements in the processor are then unloaded from the processor and compared with their expected values. This type of functional testing is becoming common for high-end microprocessors. Unfortunately, it does not lend itself to exhaustively testing the interactions among multiple processors. One reason for this is that a processor under the control of SCAN typically only executes for one or two instruction cycles, before the SCAN latches are unloaded, and another set of values loaded. The result of this is that SCAN is extremely slow, especially in comparison to the speed of modern processors. This significantly reduces the amount of testing that can be realistically done with SCAN. Secondly, there is no readily apparent mechanism available to test multiple processor at the same time, and more importantly to vary the start times of each of the multiple processors being tested together.

In the past, it has been sometimes been possible to run enough signals out of a processor that the states and state transitions being tested can be monitored by test equipment. One problem with this method of testing is that it is a manual and error prone process. Just as important, this method is fast becoming less and less possible as more and more functionality is embedded on single chips. Pin-count has become a major concern, and it has become increasingly unlikely that precious external pins can be dedicated for the sort of interprocessor state testing described above. Also, this requires that signals be driven to the outside of an integrated circuit, which often has significant adverse performance impacts.

Another problem is that much of this prior art testing and tracing is static. The paths are laid out in silicon. Invariably, the signals that need to be traced or monitored to solve a given problem are not the signals that the designers expected to need for debugging.

Solving internal processor problems would be significantly eased if a mechanism were available to dynamically and selectively trace the various internal signals and operands in a processor and to record these dynamically selected signals and operands for later retrieval and analysis. This would significantly aid in solving processor problems.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A processor contains a Trace RAM for tracing internal processor signals and operands. A first trace mode separately traces microcode instruction execution and cache controller execution. Selectable groups of signals are traced from both the cache controller and the arithmetic (AX) processor. A second trace mode selectively traces full operand words that result from microcode instruction. Each microcode instruction word has a trace enable bit that when enabled causes the results of that microcode instruction to be recorded in the Trace RAM.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Figure 1:
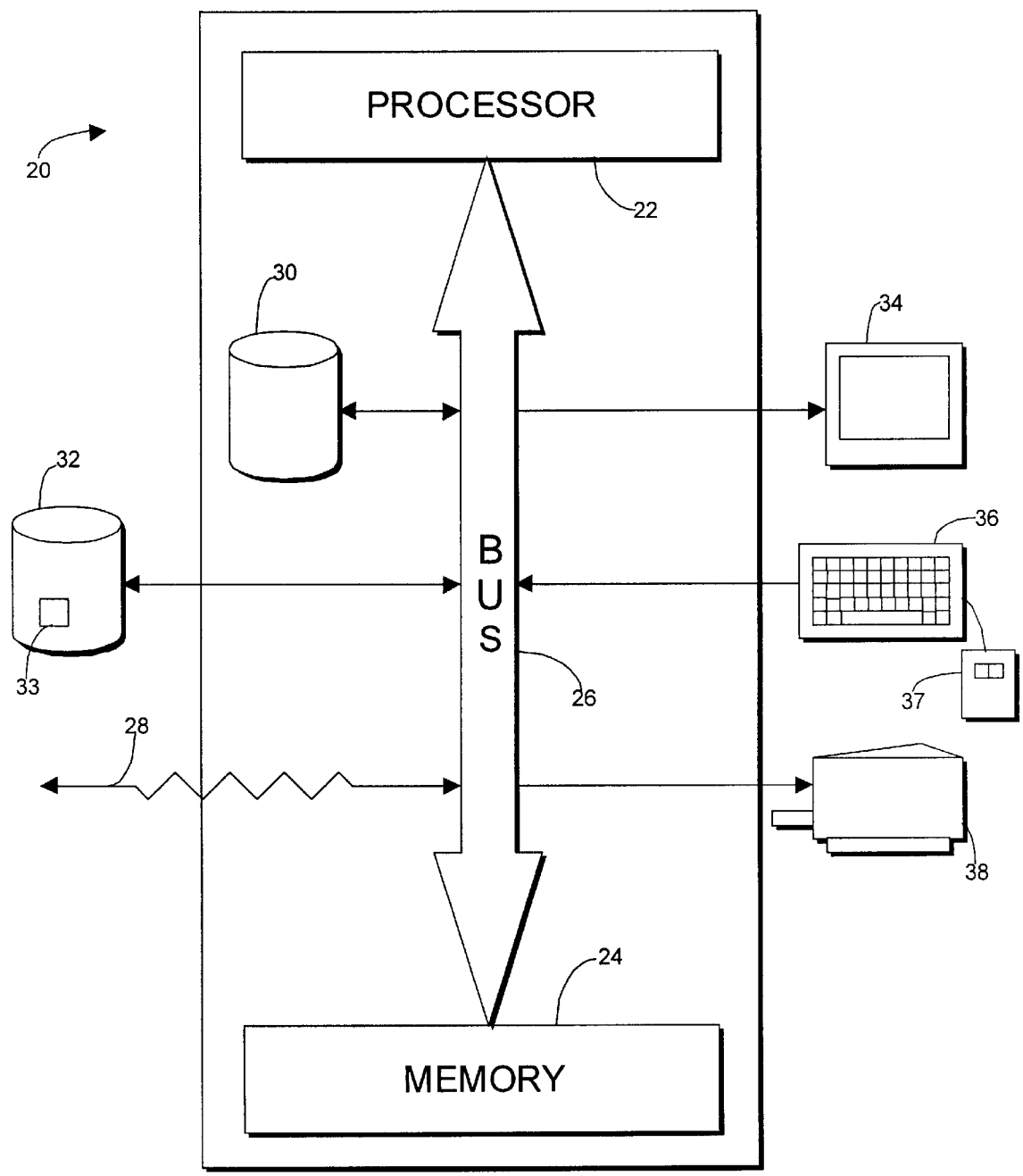
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
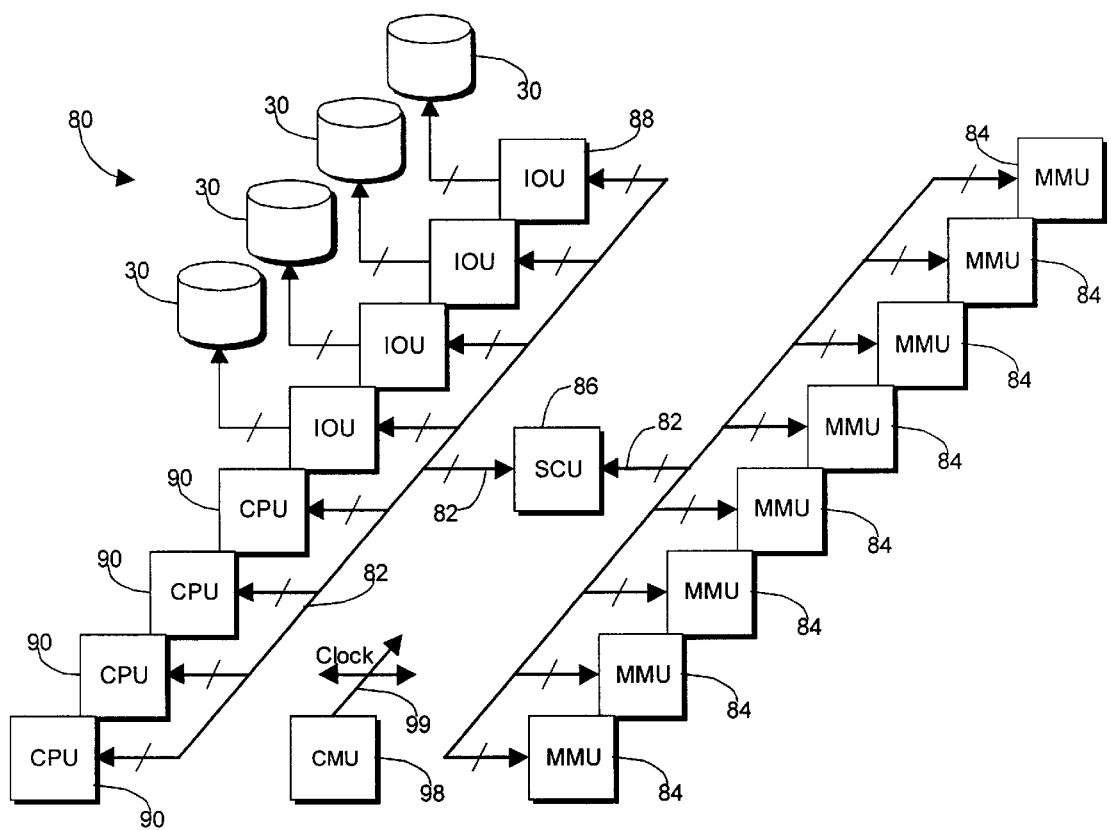
FIG. 2 is a block diagram of a more detailed view of multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MA") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Figure 3:
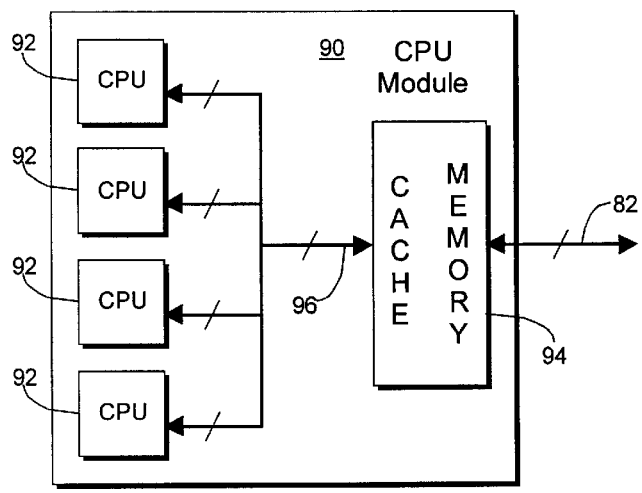
FIG. 3 is a block diagram illustrating a processor (CPU) module as shown in FIG. 2.

FIG. 3 is a block diagram illustrating a processor (CPU) module 90 as shown in FIG. 2. The CPU module 90 contains a plurality of processors (CPU) 92 and a cache memory system 94. In the preferred embodiment, each processor (CPU) module 90 contains up to four (4) processors (CPU) 92. The processors 92 and the cache memory system 94 are coupled together and communicate over an intraprocessor bus 96.

The cache memory system 94 is shared among the processors 92 on the CPU module 90 and maintains cache copies of data loaded into those processors 92. The cache memory system 94 is considered here a Level 2 cache and is coupled to and communicates with the storage control system (SCU) 88 over the intramodule bus 82 in order to maintain cache coherency between Level 1 cache memories 94 on each of the processor modules 90, as well as between cache memories 54, 56 in each of the processors 92, and on the IOU modules 88. The SCU 88 also maintains coherency between the various cache memories 94, 54, 56, and the typically slower speed memory in the MMU modules 84. In the preferred embodiment, a single block of memory will be owned by a single cache or memory at potentially each level in the memory hierarchy. Thus, a given memory block may be owned by one Level 1 cache 54, 56, by one Level 2 cache 94, and by one MMU 84.

Figure 4:
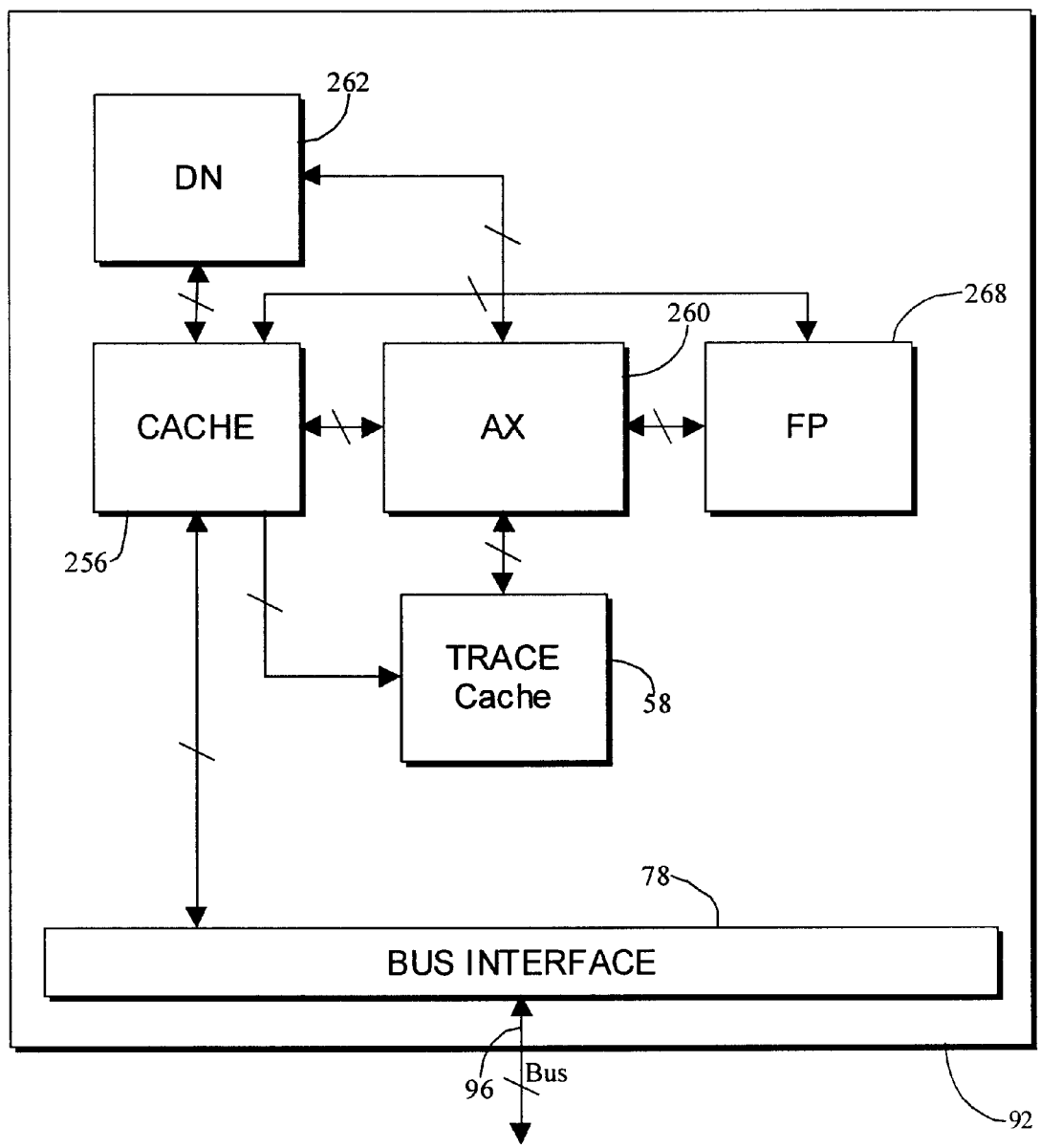
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating point unit 268 performs both floating point operations, and fixed point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Bidirectionally coupled to both the AX unit 260 and the local cache 256 is a Trace RAM cache 58 which is capable of caching the status of instruction or cache operation. The Trace RAM 58 is controlled by commands decoded and executed by the AX unit 260. The Trace RAM 58 also selectively traces AX unit 260 statuses. The Trace RAM 58 receives and selectively traces cache state signals from the local cache 256. When a trace is complete, the Trace RAM 58 can be written out to the local cache 256 through the AX unit 260, and ultimately to slower memories.

Figure 5:
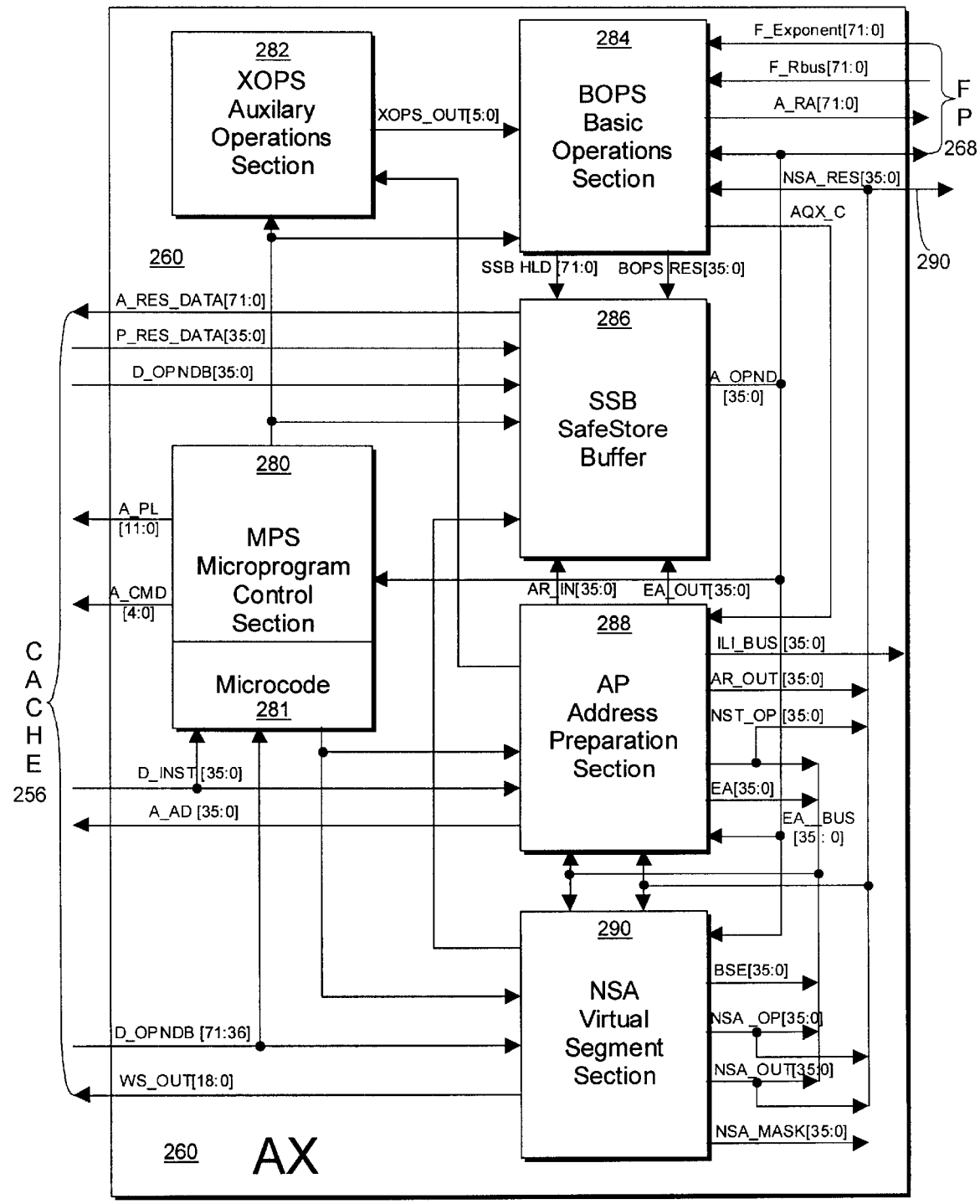
FIG. 5 is a block diagram of an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262, the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 stores the current status of the processor 92 environment, including user and segment registers, for the purpose of changing processor state. The SSB 286 is coupled to and receives signals from the BOPS 284, the AP section 288, the MPS 280, and the NSA 290. The SSB 286 is bidirectionally coupled to the local cache 256, allowing SSB 286 frames to be pushed out to cache 256 when entering a new processor environment, and pulled back from cache 256 when returning to an old processor environment.

In the preferred embodiment, the Wait for Sync (WSYNC), Transmit Sync (TSYNC), Delay (DELAY), and trace (TRACE) instructions are decoded and executed under microprogram control by the MPS 280 unit in the AX unit 260. The Wait for Sync (WSYNC) and Transmit Sync (TSYNC) instructions utilize a Synchronize (SYNCHRO) signal and receive a Synchronize (SYNCHRO) return signal.

Figure 6:
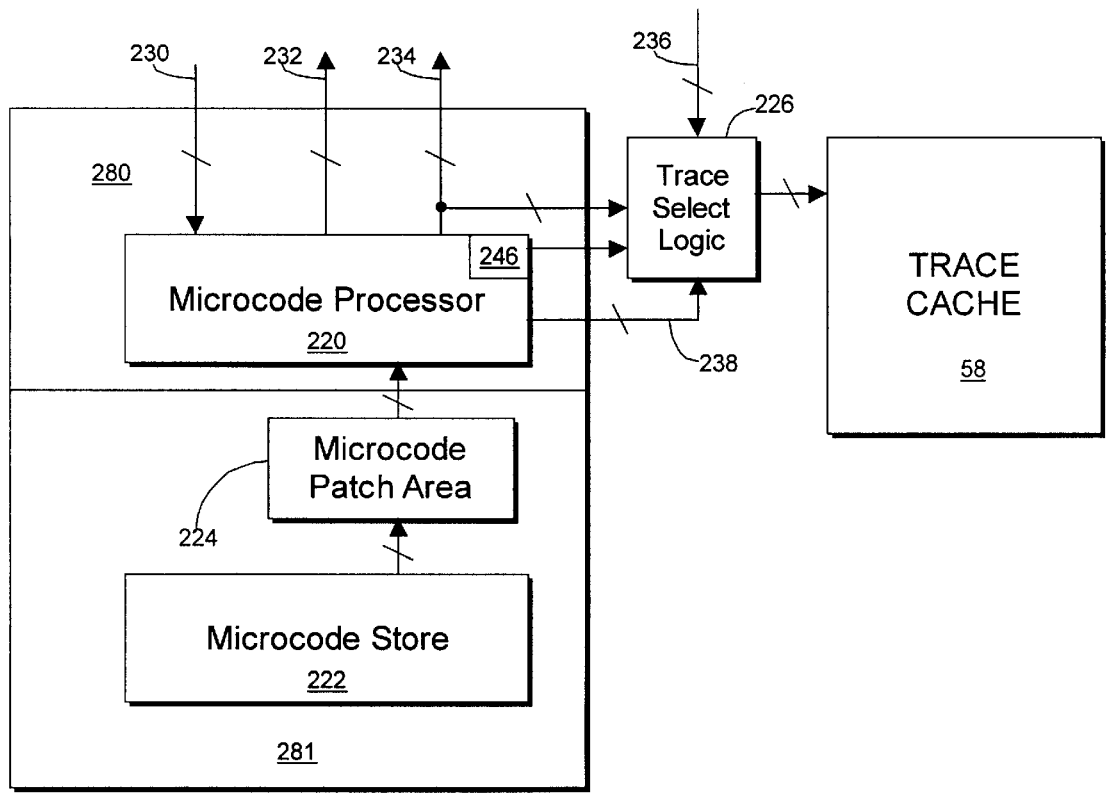
FIG. 6 is a block diagram of the Microprogram Control Section (MPS) shown in FIG. 5.

FIG. 6 is a block diagram of the Microprogram Control Section (MPS) shown in FIG. 5. The Microprogram Control Section contains a Microcode engine or processor 220. Instructions for the Microcode processor 220 are stored in a Microcode Store 222. This is typically a Non-Volatile Memory. Also coupled to the Microcode processor 220 is a Microcode Patch Area 224. This Microcode Patch Area 224 is an associative memory with the associative key being microcode program addresses in the Microcode Store 222, and the associative data being microcode instruction words. A Microcode Address (MCAD) 246 provides a microcode program instruction address. As with most processors, the microcode processor 220 steps its instruction counter (MCAD) 246 through its code, fetching the next microcode instruction, until control flow is changed through a branch. The Microcode Address 246 is utilized to fetch the next microcode instruction word from the Microcode Store 222. However, if the Microcode Address (MCAD) 246 matches one of the associative keys in the Microcode Patch Area 224, the associated word from the Microcode Patch Area 224 is provided to the Microcode Processor 220 instead. The Microcode Patch Area 224 can be modified dynamically, allowing for dynamic microcode modification, even in situations where the microcode Store 222 is Non-Volatile.

The Microcode Processor 220 receives inputs and results from computations from the other function units in the AX 260 on an input bus 230 and provides signals directing operation of the functional units in the AX 260 on an output bus 232. The Microcode Processor 220 also provides signals to the Trace Select Logic 238. Also, the current Microcode Address (MCAD) 246 is provided to the Trace Select Logic 238. The Trace Select Logic 238 receives data inputs from the functional units in the AX 260, including the NSA Result Bus 290 (see FIG. 6). The NSA Result Bus 290 carries address preparation signals from the Address Preparation Section 288 and the NSA Virtual Segment Section 290. The Trace Select Logic 226 receives control inputs 238 from the Microcode Processor 220. The Trace Select Logic 226 selects which of its inputs are to be traced, and provides such to the Trace Cache 58.

Figure 7:
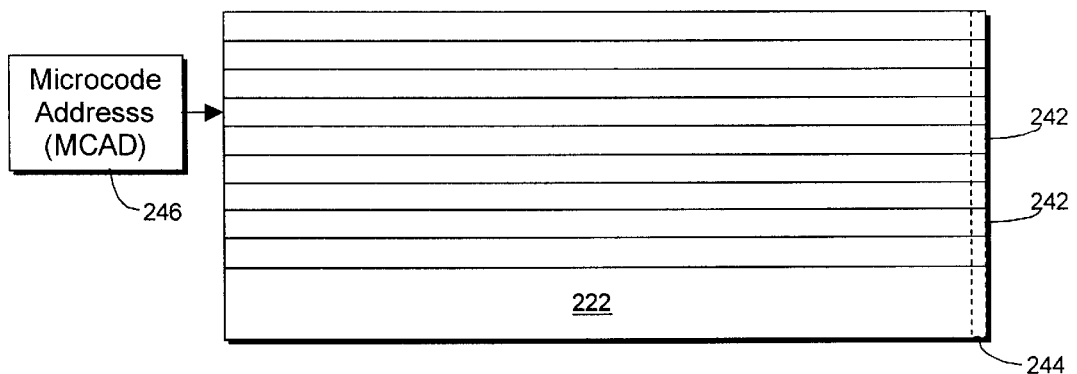
FIG. 7 is a block diagram of Microcode Store shown in FIG. 6.

FIG. 7 is a block diagram of Microcode Store shown in FIG. 6. The Microcode Address (MCAD) 246 is utilized to address microcode words 242 in the Microcode Store 222. Each microcode word 242 contains a microcode instruction. One of the bits in each microcode word 242 is a trace enable bit 244. When this trace enable bit is enabled or asserted, operand results are routed from a result bus through the Trace Select Logic 226 to the Trace Cache 58. When combined with usage of the Microcode Patch Area 224, this provides a mechanism for dynamically tracing different operands and signals throughout the AX unit 260. This is accomplished by patching the Microcode Patch Area 224 with microcode instructions from the Microcode Store 222 that are to have their results traced. The trace enable bit 244 is asserted or enabled in the Microcode Patch Area 224. Then, when the MCAD 246 indicates fetching of that microcode instruction 242, it is fetched from the Microcode Patch Area 224 instead of the Microcode Store 222. Since the trace enable bit 244 in the microcode instruction 242 is enabled, the results of the microcode instruction are sent to and recorded in the Trace Cache 58.

Figure 8:
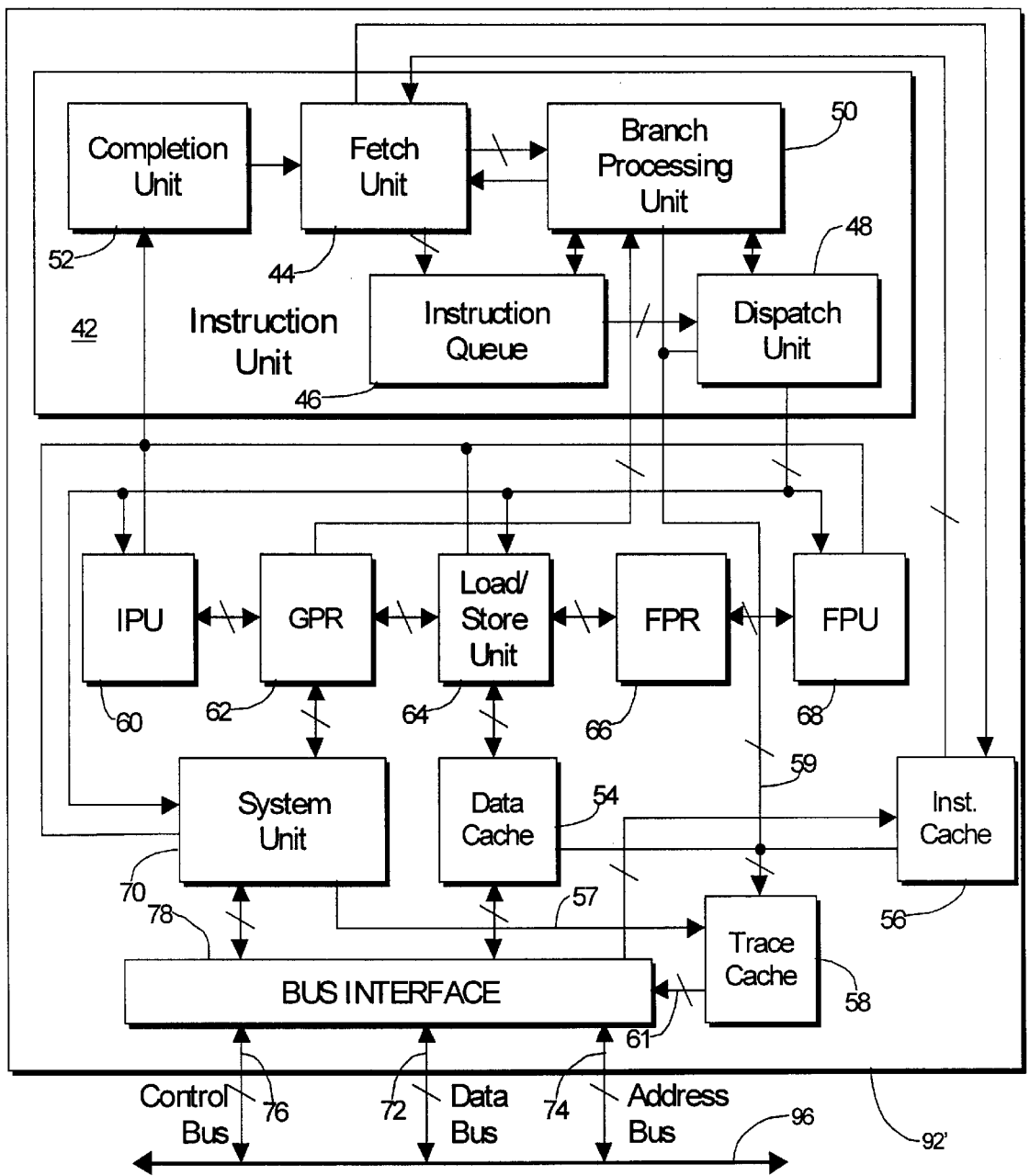
FIG. 8 is a block diagram of an alternate embodiment of the processor as shown in FIG. 3.

FIG. 8 is a block diagram of an alternate embodiment of the processor 92 as shown in FIG. 3. This alternate embodiment shows a piplelined processor 92' capable of simultaneously executing multiple instructions. The processor 92' is coupled to a bus 96. The bus 96 comprises a data bus 72, a address bus 74, and a control bus 76. Such a bus 96 is typically implemented as a hierarchy of busses. In this instance, the data bus 72, address bus 74, and control bus 76 together comprise a processor bus. The data bus 72, the address bus 74 and the control bus 76 are coupled to a bus interface 56. The bus interface 56 is coupled to a data cache 54, an instruction cache 56, and a trace cache 58. The data cache 54, the instruction cache 56 and the trace cache 58 are typically constructed of high speed SRAM. The coupling between the data cache 54 and the bus interface 58 is typically bi-directional, whereas the coupling between the bus interface 58 and the instruction cache 56 is typically single directional, since there is typically no need to write instructions back to slower memory (not shown). As noted in FIG. 3, the Instruction Cache 56, and Data Cache 54 are Level 1 caches in the memory hierarchy in the preferred embodiment.

The instruction cache 56 is coupled to and provides instructions to an instruction execution unit 52. The instruction execution unit 52 shown preferably provides for pipelined execution of multiple instructions, synchronization of out-of-order execution, and branch prediction. However, these optimizations are not necessary to practice this invention. The instruction execution unit 52 provides control signals to control execution of an Integer Processing Unit 60, a load/store unit 64, a floating point unit 68, and a systems unit 70. The load/store unit 64 is bidirectionally coupled to the general purpose registers 62, the floating point registers 66 and the data cache 54. The load/store unit 64 loads values into the general purpose registers 62 and floating point registers 66 from the data cache 54, and writes them back to the data cache 54, as required.

The general-purpose registers 62 are bidirectionally coupled to and utilized by the integer-processing unit 60 to perform integer arithmetic, as well as other logical functions. Such an integer processing unit 60 typically comprises logical/shift modules, integer addition/subtraction modules, and integer multiplication/division modules. The integer processing unit 60 will typically set condition code flags in one or more condition code registers in the general purpose registers 62 based on the results of the arithmetic and logical functions performed. These condition code flags are provided to the instruction execution unit 52 for use in conditional branching. In this preferred embodiment, the integer processing unit 60 provides for arithmetic and logical functions. The general-purpose registers 62 are also bidirectionally coupled to and utilized by the systems unit 70 to perform systems functions. The systems unit 70 executes various system-level instructions, including instructions to change environment or state. In order to maintain system state, most of the instructions executed by the systems unit 70 are completion-serialized. The floating point registers 66 are bidirectionally coupled to and utilized by the floating-point unit 68 to perform floating-point arithmetic functions.

A single integer processing unit 60 and floating point unit 68 are shown in this FIG. 8. This is done here for clarity. It should be understood that the preferred embodiment of the present invention will include multiple such functional units 60, 66. A pipelined processor 92' such as shown here will typically contain multiple integer processing units 60 providing multiple concurrent integer computations, and multiple floating point units 68 providing multiple concurrent floating point computations.

The Instruction Unit 42 comprises an instruction fetch unit 44, an instruction queue 46, an instruction dispatch unit 48, a branch processing unit 50, and an instruction completion unit 52. The instruction fetch unit 44 is coupled to and receives instructions from the instruction cache 56. The instructions fetch unit 44 provides instruction fetch control signals to the instruction cache 56. Fetched instructions are transmitted upon demand from the instruction fetch unit 44 to the instruction queue 46 for queuing. The queued instructions are subsequently removed from the instruction queue 46 and dispatched to the function units 60, 64, 68, 70 for processing by the instruction dispatch unit 48. Multiple instructions will typically be in simultaneous execution at the same time in a pipelined system. Upon completion of each of the dispatched instructions, the completing function units 60, 64, 68, 70 provide instruction completion signals to the instruction completion unit 52. The instruction completion unit 52 is coupled to and thereupon notifies the instruction fetch unit 44 of the instruction completions, allowing for further instruction fetches.

The branch-processing unit 50 is bidirectionally coupled to and receives branch instructions from the instruction fetch unit 44. The branch-processing unit 50 is coupled to and receives condition code information from the general-purpose registers 62. This condition code information is utilized by the branch-processing unit 50 to perform conditional branching. Modern branch processing units 50 in piplelined systems typically perform branch prediction and lookahead. When using branch prediction, a branch-processing unit 50 will typically provide control signals to the instruction fetch unit 44 to continue to fetch instructions until an unsolved conditional branch is resolved. The contents of general-purpose registers 62 are also received by the branch-processing unit 50 for use in indexed and indirect branching.

The systems unit 70 executes a number of instructions that are significant to the present invention. It executes a transmit sync (TSYNC) instruction for transmitting a synchronize signal to the other processors 92 in the system 80. It executes a wait-for-synchronize (WSYNC) instruction for pausing a processor 92 until it receives the synchronize signal from another processor 92. It executes a delay (DELAY) instruction for pausing or delaying a processor 92, 92' for a specified number of instruction. Finally, the systems unit 70 executes a trace (TRACE) instruction for controlling operation of the trace cache 58.

The trace cache 58 receives trace signals 59 from different modules in the processor 92. Each of these modules provides information that can be potentially traced. In the embodiment shown in FIG. 6, the trace cache 92 is coupled to and receives trace signals 59 from the data cache 54, the instruction cache 56, the branch processing unit 50, and the dispatch unit 48. The trace signals 59 from the data cache 54 and the instruction cache 56 include internal cache state signals. This provides a mechanism for recording in real time state changes for the cache memories 54, 56. The trace cache is coupled to and provides a trace output signal 61 to the bus interface 78. This allows the contents of a trace buffer to be selectively written to and saved in slower speed memory 24 in an MMU 84. This is typically done at the end of a trace so that the data traced can be processed.

Figure 9:
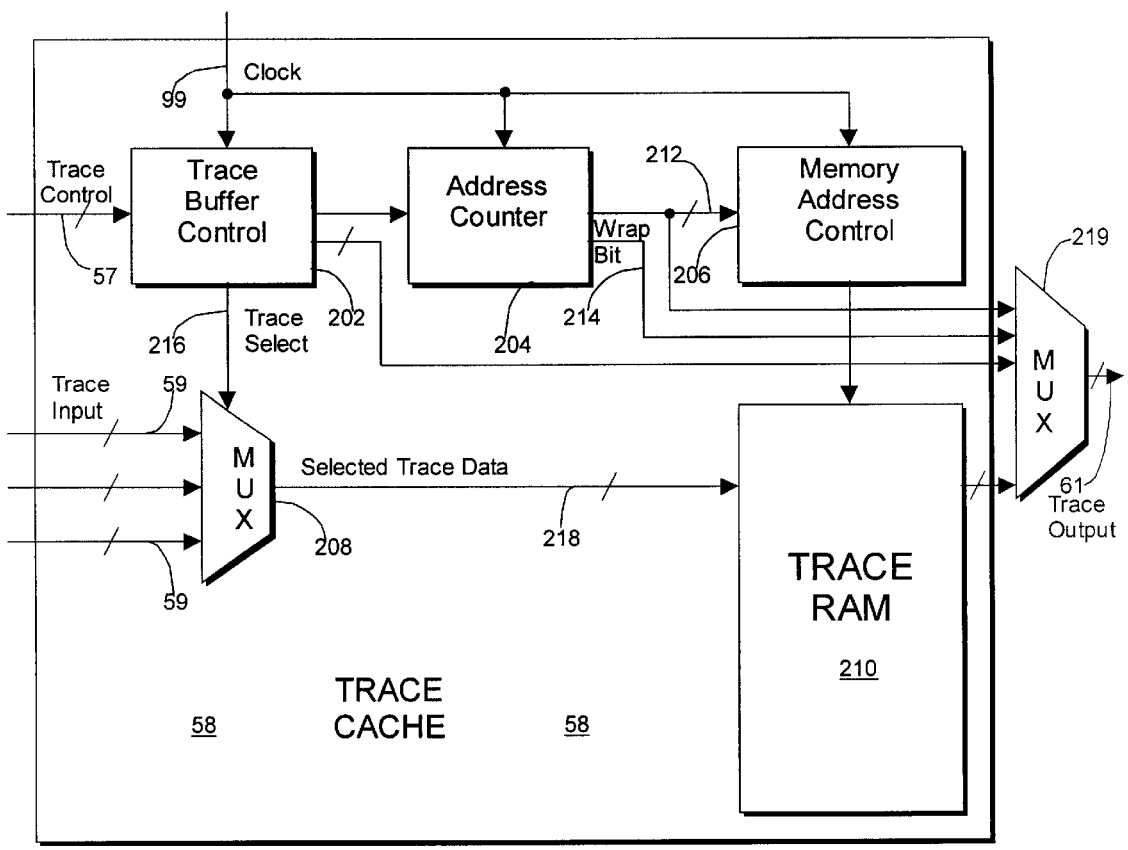
FIG. 9 is a block diagram illustrating the trace cache shown in FIG. 4.

FIG. 9 is a block diagram illustrating the trace cache 58 shown in FIGS. 4 and 8. The systems unit 70 provides trace control signals 57 to a trace buffer control module 202 in response to execution of a Trace instruction. Alternatively, tracing can be enabled through microcode modification. The trace buffer control module 202 provides control signals to an address counter module 204. The address counter module 204 is typically reset by the trace buffer control module 202 when a trace is started. The address counter module 204 is a counter that increments at each clock 99. Address counter module 204 selectively either wraps around, or terminates a trace when it hits its limit. If the address counter module 204 terminates a trace, the completion is transmitted to the completion unit 52. A In any case, the address counter module 204 provides an address signal 212 to a memory address control module 206. The address signal 212 provided is the address of the next trace entry in a trace RAM array 210 to receive data. The memory address control module 206 stores a single trace entry in the Trace RAM 210 at the address specified by the address signal 212 at assertion of each clock b signal.

Trace input signals 59 are coupled to and received by a multiplexor (MUX) 208. The trace buffer control module 202 is coupled to and provides trace select signals 216 to the MUX 208 to select trace input signals 59 for tracing. The selection by the trace buffer control module 202 is in response to execution of a TRACE instruction by the systems unit. The MUX 208 provides a Selected Trace Data signal 218 by selecting Trace input signals 59 in response to trace select signals 216. The values of the Selected Trace Data signals 218 are written in the Trace Ram 210 at the location specified by the address counter 204 at the assertion of each clock 99. In one embodiment, a high-order bit from the address counter module 204 is written with each trace entry in the trace RAM 210. This provides a mechanism for continuously wrapping the trace RAM 210 with trace entries. Then, when the trace data is downloaded to slower memory and evaluated, the trace entries can be properly unrolled based on this wrap bit 214, since the wrap bit 214 toggles for each cycle through the trace RAM 210.

The trace cache 58 operates by storing one entry into the trace RAM 210 for each assertion of the clock signal 99. The trace RAM is preferably high-speed memory, such as high speed Static Random Access Memory (SRAM), with a write time no longer than the width of the clock signal 99. The entire trace entry is typically a power of two ($2^x$) in size, such as 16, 32, 64, or 128 bits in size. The trace RAM will typically contain a power of two ($2^y$) number of trace entries. This allows for easy wrapping of the address counter 204 when computing memory write addresses 212. The trace RAM in the preferred embodiment contains 512 ($2^9$) trace entries.

The Trace cache 58 shown in FIG. 9 contains single Address Counter 204. However, the preferred embodiment contains a pair of Address Counters 204. In a first (Debug Trace) mode (TSEL-NSA-RES=0), The two Address Counters 204 operate independently. The Trace RAM 210 contains 36 bit words. Of those 36 bits, two groups of eight bits are dedicated to the cache controller 256, allowing tracing of different selectable sets of eight signals. Another group of eight selectable signals is dedicated to the AX unit 260. These are combined with a 13 bit MCAD 246 and a 1-bit wrap bit. A first Address Counter 204 (CTRAM-ADD) is utilized to store the values of the two selected 8-bit signals from the cache controller. The second address counter 204 (ATRAM-ADD) is utilized to store the values of the MCAD 246 and 8-bits of results from modules in the AX unit 260. One advantage of decoupling these two sets of results is that it provides a mechanism for tracing operation of the cache controller 246 which can operate when the AX unit 260 is stalled, for example when a cache siphon operation is retrieving data from another cache memory 246, 94. Duplicative cache controller 246 trace entries are suppressed in order to maximize trace information content.

The second (operand trace) mode (TSEL-NSA-RES=1) when enabled forces the two address counters 204 to operate together. Thirty-six bit operands from various AX functional units are stored in the Trace RAM 210 whenever the executing microcode instruction has its trace enable bit 244 enabled.

In the preferred embodiment, the Trace RAM 210 contained 36-bit trace entries, corresponding to the 36-bit words utilized for data and instructions in the GCOS 8 architecture. Other word sizes are within the scope of this invention. A single address counter 204 was shown in FIG. 8. A larger number of such are within the scope of this invention. Two different trace modes were disclosed. Other numbers of trace modes are also within the scope of this invention.

Tracing is initiated in the preferred embodiment with execution of a TRACE instruction. Tracing continues until either the Trace RAM 210 fills up, if wrapping is not allowed (FREE-TRACE=0), or the processor halts. The results in the Trace RAM 210 can either be read from the Trace RAM 210 by a Dump Trace (DTRACE) instruction via the AX unit 260 into main memory 24, or retrieved through the maintenance subsystem (not shown) when the processor is halted. In the Debug Trace mode (TSEL-NSA-RES=0), tracing is typically disabled upon fault processing reenabled at the end of fault processing by execution of a RICHR instruction.

The DTRACE instruction will dump the entire Trace RAM 210 (512 36-bit entries) to the local cache 256 via the AX unit 260, and thence to slower memory 24. This is followed by a one word entry that contains trace identification information that is stored in the A register in the AX unit 260. Table T-1 contains the contents of the dump status word stored in the A register.

TABLE T-1

Dump Trace Table Register Format

| Bit(s) | Name | Function |
| --- | --- | --- |
| 00 | FREE-TRACE | 1 => allows the trace ram to continuously capture data, address wraps on 512 entry RAM. 0 => trace RAM captures 512 entries and then stops. |
| 01 | TEL-NSA-RES | 1 => the source of the data to be written into the trace RAM is the NSA-RES-BUS 268. 0 => the source of the data is the DEBUG bus. |
| 02 | ISOLATE-TRAM | 0 => whichever address counter reaches a count of 511 first stops both address counters. 1 => each address counter runs until it reaches a count of 511 independent of the other counter. |
| 03–10 | CTRAM-ADD | Address counter bits for upper 16 bits of trace RAM (does not contain LSB). |
| 11–15 | COPY-CC-DEBUG-SO | A copy of the cc-debug-so configuration bits which controls one set of eight bits of cache controller tracing. |
| 16–23 | ATRAM-ADD | Address counter bits for the lower 20 bits of trace RAM (does not contain LSB). |
| 24–25 | COPY-CC-DEBUG-EN | A copy of the cc-debug-en configuration bits which control overall cache controller tracing. |
| 26–35 | COPY-CC-DEBUG-S1 | A copy of the cc-debug-s1 configuration bits which controls one set of eight bits of cache controller tracing. |

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A processor wherein:

said processor comprising:

a microcode engine capable of executing microcode instructions and comprising:

a microcode instruction address counter that provides a set of microcode instruction address signals;

a microcode store, comprising a microcode patch memory, wherein:

the microcode store responds to the set of microcode instruction address signals, the microcode store contains a plurality of microcode instruction words containing microcode instructions for execution by the microcode engine;

each of the plurality of microcode instruction words has a plurality of microcode instruction bits, and a one of the plurality of microcode instruction bits is a trace enable bit having a first state and a second state;

a trace memory containing a plurality of trace words;

a trace memory controller that controls writing a selected set of trace memory input signals as a set of values to the trace memory; and a circuit for routing a first set of signals to the trace controller as a first set of trace memory input signals for tracing when the microcode engine executes a microcode instruction having its trace enable bit in the first state.

2. The processor in claim 1 wherein:

the microcode patch memory is an associative memory with a plurality of associative memory tags;

each of the plurality of associative memory tags contains a microcode instruction address and is associated with a microcode instruction word;

when the microcode engine generates a set of microcode instruction address signals equal to a one of the plurality of associative memory tags in the microcode patch area, the microcode instruction associated with the one of the plurality of associative memory tags is provided to the microcode engine as a next microcode instruction to execute; and when the microcode engine generates the set of microcode instruction address signals not equal to any of the plurality of associative memory tags, the next microcode instruction to execute is provided to the microcode engine from the microcode store.

3. The processor in claim 1 which further comprises:

a trace mode indicator having a first state and a second state, wherein:

the circuit for routing the first set of trace memory input signals to the trace memory is enabled when the trace mode indicator is in the first state and is disabled when the trace mode indicator is in the second state.

4. The processor in claim 3 wherein:

the trace controller comprises:

a circuit for selecting the first set of trace memory input signals or a second set of trace memory input signals as the set of selected trace memory input signals, wherein:

the first set of trace memory input signals is selected as the set of selected trace memory input signals when the trace mode indicator is in the first state; and the second set of trace memory input signals is selected as the set of selected trace memory input signals when the trace mode indicator is in the first state.

5. The processor in claim 4 wherein:

the trace controller further comprises:

a first trace entry address counter and a second trace entry address counter; wherein:

the first trace entry address counter and the second trace entry address counter each address a one of the plurality of trace words;

when the trace mode indicator is in the first state, the first trace entry address counter and the second trace entry address counter increment together; and when the trace mode indicator is in the second state, the first trace entry address counter and the second trace entry address counter can increment separately.

6. The processor in claim 5 wherein:

the second set of trace memory input signals comprises a first subset of trace memory input signals and a second subset of trace memory input signals;

the first trace entry address counter is utilized to write the first subset of trace memory input signals to the trace memory; and the second trace entry address counter is utilized to write the second subset of memory input signals to the trace memory.

7. The processor in claim 6 wherein:

the first subset of trace memory input signals comprises:
a set of instruction execution signals from an instruction execution unit.

8. The processor in claim 7 wherein:

the first subset of trace memory input signals further comprises:
a subset of microcode instruction address signals from the microcode engine.

9. The processor in claim 6 wherein:

the second subset of trace memory input signals comprises:
a set of cache controller execution signals from a cache controller.

10. The processor in claim 9 wherein:

the first subset of trace memory input signals comprises:
a set of instruction execution signals from an instruction execution unit; and a set of values representing the second subset of trace memory input signals continues to be written to the trace memory utilizing the second trace entry address counter while the instruction execution unit is stalled and the first trace entry address counter is not being incremented.

11. The processor in claim 9 wherein:

duplicative cache controller trace entries are suppressed and not recorded in the trace memory.

12. The processor in claim 1 which further comprises:

a trace termination indicator having a first state and a second state, wherein:
when the trace termination indicator is in the first state, the trace controller terminates tracing when the trace memory is filled; and
when the trace termination indicator is in the second state, the trace controller wraps trace entries when the trace memory is filled.

13. The processor in claim 1 which further comprises:

a microcode patch memory containing a plurality of microcode instruction words, wherein:
the microcode patch area is an associative memory with a plurality of associative memory tags,
each of the plurality of associative memory tags contains a microcode instruction address and is associated with a microcode instruction word,
when the microcode engine generates a set of microcode instruction address signals equal to a one of the plurality of associative memory tags in the microcode patch area, the microcode instruction associated with the one of the plurality of associative memory tags is provided to the microcode engine as a next microcode instruction to execute, and
when the microcode engine generates the set of microcode instruction address signals not equal to any of the plurality of associative memory tags, the next microcode instruction to execute is provided to the microcode engine from the microcode store;

a trace mode indicator having a first state and a second state, wherein:
the circuit for routing the first set of trace memory input signals to the trace memory is enabled when the trace mode indicator is in the first state and is disabled when the trace mode indicator is in the second state; and wherein:
the trace controller comprises:
a circuit for selecting the first set of trace memory input signals or a second set of trace memory input signals as the set of selected trace memory input signals, wherein:
the first set of trace memory input signals is selected as the set of selected trace memory input signals when the trace mode indicator is in the first state, and
the second set of trace memory input signals is selected as the set of selected trace memory input signals when the trace mode indicator is in the first state, and
a first trace entry address counter and a second trace entry address counter; wherein:
the first trace entry address counter and the second trace entry address counter each address a one of the plurality of trace words,
when the trace mode indicator is in the first state, the first trace entry address counter and the second trace entry address counter increment together, and
when the trace mode indicator is in the second state, the first trace entry address counter and the second trace entry address counter can increment separately.

14. A processor wherein:

said processor comprises:

a microcode engine capable of executing a plurality of microcode instructions, wherein:
each of the plurality of microcode instruction words has a plurality of microcode instruction bits, and
a one of the plurality of microcode instruction bits is a trace enable bit having a first state and a second state;

a trace memory containing a plurality of trace words;

a trace mode indicator having a first state and a second state; and a trace memory controller that controls writing a one of a set of trace memory input signals as a set of values to the trace memory;

said trace memory controller comprising:

a circuit for selecting a first set of trace memory input signals or a second set of trace memory input signals as the set of selected trace memory input signals, wherein:
the first set of trace memory input signals is selected as the set of selected trace memory input signals when the trace mode indicator is in the first state,
the first set of trace memory input signals is received from an operand result bus when the microcode engine executes a microcode instruction having its trace enable bit in the first state, and the second set of trace memory input signals is selected as the set of selected trace memory input signals when the trace mode indicator is in the second state.

15. The processor in claim 14 wherein:

the trace controller further comprises:
- a first trace entry address counter and a second trace entry address counter; wherein:
  - the first trace entry address counter and the second trace entry address counter each address a one of the plurality of trace words;
  - when the trace mode indicator is in the first state, the first trace entry address counter and the second trace entry address counter increment together; and
  - when the trace mode indicator is in the second state, the first trace entry address counter and the second trace entry address counter can increment separately.

16. The processor in claim 15 wherein:

the second set of trace memory input signals comprises a first subset of trace memory input signals and a second subset of trace memory input signals;

the first trace entry address counter is utilized to write the first subset of trace memory input signals to the trace memory; and the second trace entry address counter is utilized to write the second subset of memory input signals to the trace memory.

17. The processor in claim 16 wherein:

the first subset of trace memory input signals comprises:
- a set of instruction execution signals from an instruction execution unit.

18. The processor in claim 16 wherein:

the second subset of trace memory input signals comprises:
- a set of cache controller execution signals from a cache controller.

19. A processor wherein:

said processor comprises:

a trace memory containing a plurality of trace words;

a trace mode indicator having a first state and a second state; and a trace memory controller that controls writing a set of selected trace memory input signals as a set of values to the trace memory;

said trace memory controller comprising:
- a circuit for selecting a first set of trace memory input signals or a second set of trace memory input signals as the set of selected trace memory input signals, wherein:
  - the first set of trace memory input signals is selected as the set of selected trace memory input signals when the trace mode indicator is in the first state; and
  - the second set of trace memory input signals is selected as the set of selected trace memory input signals when the trace mode indicator is in the first state, and
- a first trace entry address counter and a second trace entry address counter; wherein:
  - the first trace entry address counter and the second trace entry address counter each address a one of the plurality of trace words;
  - when the trace mode indicator is in the first state, the first trace entry address counter and the second trace entry address counter increment together; and
  - when the trace mode indicator is in the second state, the first trace entry address counter and the second trace entry address counter can increment separately.

* * * * *